Patented July 26, 1938

2,124,877

UNITED STATES PATENT OFFICE 2,124,877

HARD ALLOY CUTTING TOOL

Hyrum E. Flanders, Middletown, Ohio, assignor to The American Rolling Mill Company, Middletown, Ohio, a corporation of Ohio No Drawing. Application September 23, 1935, Serial No. 41,774

1 Claim. (Cl. 75—123)

My invention relates to an alloy, the most important characteristic of which is hardness, giving an effect of extreme abrasion resistance, and which is suitable for use for castings, welding rods, or cutting tools. My material has found important uses as abrasion resistant castings such as wheel abrator blades, mixer teeth or plates in pug mills or cement mixers, and in the manufacture of crushing and grinding machinery such as crusher jaws, rolls or plates. By reason of its extreme hardness, it is useful in the making of cutting tools for metal and other hard substances and has this advantage: that the metal cutting tools may be simply and individually made in the form of castings and cutting edges produced thereon or dressed by grinding. It is also useful for the production of welding rods by means of which a facing or edge of my alloy may be placed upon an article made of less resistant metal where it is inconvenient or uneconomical to make the whole article of my metal.

The general objects of my invention will be clear from the aforegoing or will be pointed out hereinafter, and these objects I accomplish in that particular alloy of which I shall give certain exemplary embodiments. Although susceptible of many of the same uses, my alloy does not properly fall under the classification of a high speed steel. On the contrary the base is essentially a white cast iron to which other elements have been added for certain specific purposes in accordance with my investigations. By a white cast iron, I mean essentially an iron containing approximately 2.25 to 4.50 per cent of carbon and 0.18 to 0.50 per cent of manganese, and low in both phosphorus and sulphur. By this I mean low as ordinarily understood in the art, the phosphorus content being say between 0.003, which is a practical minimum, and 0.22 per cent and the sulphur ranging from a practical minimum of 0.02 per cent to 0.15 per cent.

A base of this character is converted into an exceedingly hard and abrasion resistant alloy by the addition thereto of 4.50 per cent to 10.00 per cent of molybdenum. The alloy also should contain from 0.20 to 1.25 per cent of silicon preferably the lower percentages where graphitization is to be minimized. Especially where the alloy is to be welded or where it is to be formed into welding rods, I prefer to have present aluminum or a substitute metal such as titanium in an amount ranging from 0.20 to 1.00 per cent. This gives a material very well adapted to welding, without the production of gas in the weld, and without the production of brittleness.

For general use my alloy may therefore have the following approximate composition:

|  | Per cent |
|---|---|
| Carbon | 2.25 to 4.50 |
| Manganese | 0.18 to 0.50 |
| Phosphorus | 0.003 to 0.22 |
| Sulphur | 0.02 to 0.15 |
| Silicon | 0.20 to 1.25 |
| Molybdenum | 4.50 to 10.00 |
| Aluminum if any | 0.20 to 1.00 |

As an example of a particular composition for a particular use made in accordance with my invention, I may give the following:

|  | Per cent |
|---|---|
| Carbon | 3.50 |
| Manganese | 0.25 |
| Silicon | 0.30 |
| Molybdenum | 8.00 |
| Aluminum | 0.50 | with phosphorus and sulphur within the ranges specified.

This makes a composition especially suitable for the production of welding rods to be primarily used in giving to other metal articles a hard and abrasion resistant facing.

The choice of the most desirable aluminum or titanium content depends somewhat on the carbon content and on the amount of oxides to be met with in making welds. The concentration must be sufficient to avoid the formation of carbon monoxide gas by reaction between the carbon and the oxides encountered and at the same time low enough to avoid the formation with the oxygen of the atmosphere of heavy scums of aluminum oxide that interfere with successful welding.

The choice of carbon is based on the nature of the service to be given and the economies to be met. For many services a low carbon (2.50%) with a low molybdenum content (5.00%) is suitable. However for severe service not subjected to such severe shock a high carbon content (3.50–4.00%) with the corresponding higher molybdenum content 7.00–10.00% is much more abrasion resistant. This higher carbon composition also gives castings and welds which are less susceptible to variations due to different heat treatments and therefore have greater uniformity. Cast cutting tools of the analysis mentioned above with 3.50% carbon are thus much better than those made with 2.50% C.

Alloys within the general composition ranges which I have set forth have a Rockwell hardness of about C-60 to C-63 as cast. My facing or edging material after having been welded in place is somewhat softer, when deposited by electrical welding it has a Rockwell hardness of about C-52 to C-56 and when deposited through the action of a gas flame its Rockwell hardness is about C-56 to C-58.

Having thus described my invention, what I claim as new and desire to secure by Letters Patent is:

A hard and abrasion resistant cutting tool formed by casting from an alloy having a cast iron base and a composition within the following ranges: carbon 3.00 to 4.50%, manganese 0.18 to 0.50%, silicon 0.20 to 1.25%, molybdenum 5.1 to 10.00%, balance substantially all iron.

HYRUM E. FLANDERS.